United States Patent [19]
Rossteuscher

[11] Patent Number: 5,703,291
[45] Date of Patent: Dec. 30, 1997

[54] POWER CLAMPING SYSTEM FOR MOUNTING/SECURING OF AUTOMOTIVE WHEEL ASSEMBLIES ONTO WHEEL BALANCING MACHINES

[75] Inventor: Gerhard Rossteuscher, Belleville, Canada

[73] Assignee: Hofmann Werkstatt-Technik GmbH, Pfungstadt, Germany

[21] Appl. No.: 614,245

[22] Filed: Mar. 12, 1996

[30] Foreign Application Priority Data

Mar. 28, 1995 [DE] Germany .................. 195 11 405.1

[51] Int. Cl.⁶ .................................................. G01M 1/06
[52] U.S. Cl. ................................................... 73/487
[58] Field of Search ............................ 73/487, 459, 483, 73/484

[56] References Cited

U.S. PATENT DOCUMENTS

| | | | |
|---|---|---|---|
| 3,152,484 | 10/1964 | Hemmeter | 73/484 |
| 3,165,932 | 1/1965 | Hemmeter | 73/484 |
| 3,889,542 | 6/1975 | Carrigan | 73/487 |
| 4,005,607 | 2/1977 | Wiederrich | 73/483 |
| 4,118,989 | 10/1978 | Wood | 73/487 |
| 4,229,977 | 10/1980 | Newton | 73/487 |
| 4,423,633 | 1/1984 | Coetsier | 73/487 |
| 4,864,859 | 9/1989 | Jensen | 73/473 |

*Primary Examiner*—Hezron E. Williams
*Assistant Examiner*—Helen C. Kwok
*Attorney, Agent, or Firm*—Cushman Darby & Cushman, IP Group of Pillsbury Madison & Sutro, LLP

[57] ABSTRACT

A clamping arrangement for clamping a rotary member to be balanced on a main shaft of a balancing machine comprises a centering cone which is axially resiliently supported on the shaft for centering the rotary member with respect to the shaft. A pressure element can be fixed on the shaft for pressing the rotary member against the centering cone into a centering position, and a support flange holds the rotary member against the pressure element. The support flange is non-rotatably and axially displaceably mounted on the shaft and can be pressed by an actuating means against the rotary member which is held in a centered condition, whereby the rotary member is clamped against the pressure element on the shaft.

11 Claims, 2 Drawing Sheets

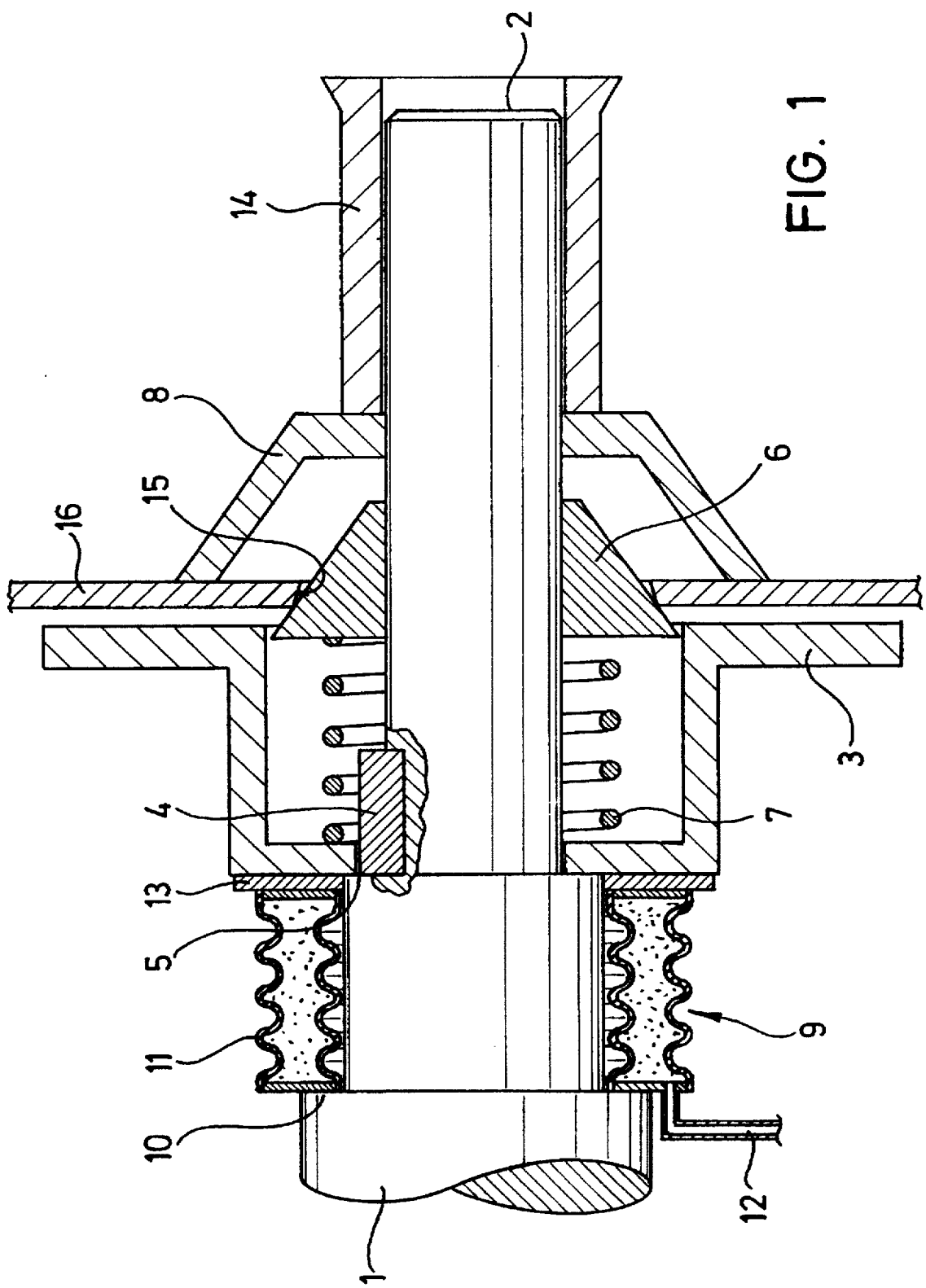

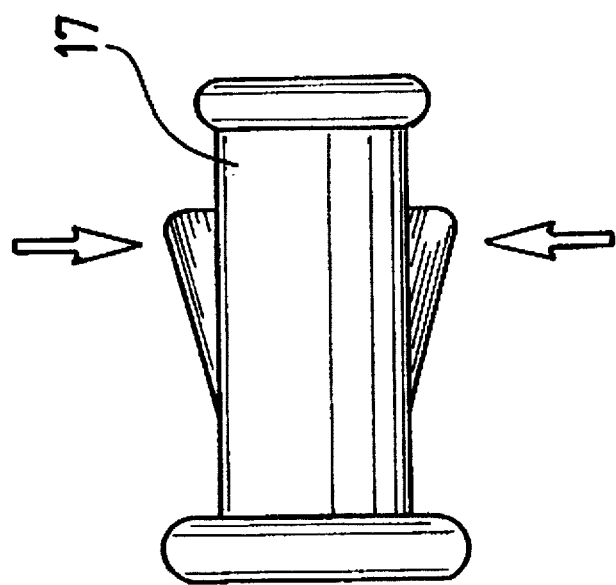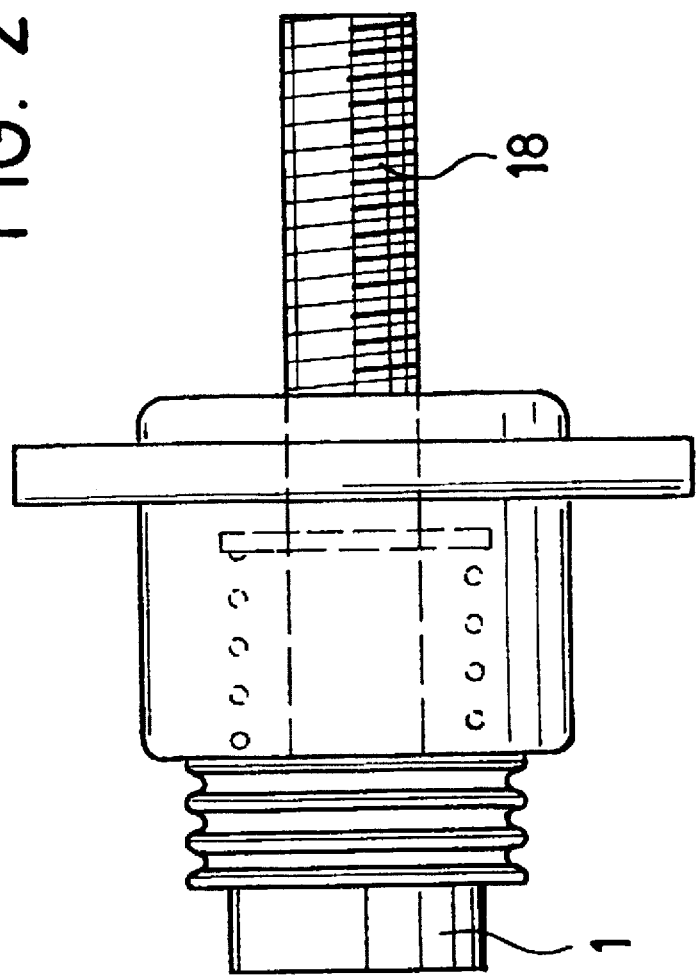

POWER CLAMPING SYSTEM FOR MOUNTING/SECURING OF AUTOMOTIVE WHEEL ASSEMBLIES ONTO WHEEL BALANCING MACHINES

FIELD OF THE INVENTION

The present invention concerns a clamping arrangement for clamping a rotary member to be balanced, for example a motor vehicle wheel, on a main shaft of a balancing machine. The invention further concerns a balancing machine including such a clamping arrangement.

BACKGROUND OF THE INVENTION

One form of clamping arrangement for clampingly mounting a rotary member to be balanced such as a motor vehicle wheel on a main shaft of a balancing machine comprises a centering cone which is axially resiliently supported on the main shaft of the balancing machine, to center the rotary member with respect to the shaft. A pressure element can then be fixed on the main shaft, to press the rotary member against the centering cone and into a centering position, with a support flange member holding the rotary member against the pressure element. An arrangement of that kind is to be found in German laid-open application (DE-OS) No 24 24 668. In that case a motor vehicle wheel is centrally clamped fast on the balancing machine, by virtue of being centered on the main shaft by the centering cone which engages the central opening in the motor vehicle wheel, the motor vehicle wheel thus being clamped against the support flange member in the centered position. The clamping force which is required for that purpose is applied by a clamping screw which can be screwed on to the main shaft of the machine and which is provided with suitable handle portions in order for it to be actuated by the machine operator. A disadvantage with this assembly however is that the entire clamping force required has to be applied by the operator by hand, by means of the clamping screw, and considerably force has to be applied in order subsequently to release the clamping screw.

SUMMARY OF THE INVENTION

An object of the present invention is to provide a clamping arrangement for mounting a rotary member to be balanced on a balancing machine shaft, which is easier for the operator to operate while nonetheless affording a sound and secure clamping effect.

Another object of the present invention is to provide a clamping arrangement for mounting a rotary member to be balanced on a balancing machine shaft, which is of a simple design configuration involving a minimum number of parts to facilitate fitting of the rotary member on the machine while affording a good clamping effect.

Still another object of the present invention is to provide a balancing machine including a clamping arrangement for mounting a rotary member on the balancing machine shaft, in which the operator is at least partially relieved of strain when clamping the rotary member on the machine.

In accordance with the principles of the present invention the foregoing and other objects are achieved by a clamping arrangement for clamping a rotary member to be balanced, such as a motor vehicle wheel, on a main shaft of a balancing machine, comprising a centering cone adapted to be axially resiliently supported on the shaft to center the rotary member with respect to the shaft, and a pressure element adapted to be fixed on the shaft for pressing the rotary member against the centering cone and thus into a centering position. A support flange member is operable to hold the rotary member against the pressure element. The support flange member is non-rotatably and axially displaceably mounted on the main shaft of the machine, and an actuating means presses the support flange member against the centeredly held rotary member so that the latter can be clamped against the pressure element which is fixed on the main shaft.

Further in accordance with the principles of the invention the foregoing and other objects are achieved by a balancing machine including a main shaft for supporting a rotary member to be balanced, and a clamping arrangement for mounting the rotary member on the shaft, the arrangement comprising a centering cone; means axially resiliently supporting the cone on the main shaft for centering the rotary member with respect to the main shaft; a pressure element on the main shaft and operable to press the rotary member against the centering cone and into a centering position; a support flange member for holding the rotary member against the pressure element; means mounting the support flange member non-rotatably and axially displaceably on the main shaft; and an actuating means for pressing the support flange member against the rotary member whereby the latter can be clamped against the pressure element on the main shaft.

As will be apparent from the following description of a preferred embodiment of the present invention, the axial displaceability of the support flange member means that the required clamping force for fixing the rotary member on the balancing machine shaft is applied to the rotary member by way of the movement of the support flange member. In combination with an actuating means for displacing the support flange member, which affords the possibility of producing the clamping force by mechanical means such as a power-operated assembly, that affords the advantage that the operator of the machine no longer has to apply the comparatively high clamping force by hand, but only has to apply the lower centering force which is required when the pressure element is pressed against the rotary member.

The actuating means can be any suitable device which acts on the support flange member and axially displaces same. In a preferred feature the actuating means has at least one axial expansion element adapted to be mounted on the main shaft. Such an element is also suitable for subsequent fitment to existing balancing machines of a simpler design type which do not have mechanically operable actuating means, as for example in the case of balancing machines having a pull rod in an axial bore in the main shaft, with which rod the pressure element can be actuated.

In accordance with another preferred feature of the invention the actuating means includes at least one pneumatically actuable air bellows, thus constituting a particularly simple design configuration in this respect with which the clamping force can be rapidly and reliably produced. In addition, the required compressed air supply is already available in workshops, or the compressed air required can be produced by means of an electrically operated compressor. It is also possible to use a hydraulic element with hydraulic actuation or a mechanically actuable axial expansion element such as for example involving a spindle. In that respect one or more axial expansion elements may be arranged in a distributed configuration at the periphery of the main shaft, or an annular axial expansion element and in particular an annular air bellows can be disposed around the main shaft. If it is mounted rotatably on the main shaft, the air feed line can be of a simpler design than in the case of an air bellows assembly which is required to rotate with the main shaft and which would then require a special air connecting unit.

Preferably the clamping arrangement includes a sleeve on which some or all components thereof are mounted. The clamping arrangement can be easily fitted to existing main shafts of balancing machines without any need to effect adaptation alterations on the main shaft. When such a sleeve is employed, standardised components of the clamping arrangement can be used even in relation to main shafts of different sizes or configurations.

Further objects, features and advantages of the present invention will be apparent from the following description of a preferred embodiment thereof.

BRIEF DESCRIPTION OF THE DRAWING

FIG. 1 is a view in axial longitudinal section of the clamping arrangement on a main shaft of a balancing machine, and FIG. 2 is a simplified diagrammatic view of the clamping arrangement with a fixing device for a pressure element.

DESCRIPTION OF THE PREFERRED EMBODIMENT

Referring to FIG. 1, reference numeral 1 therein denotes part of a main shaft of a balancing machine, having a free shaft end portion as indicated at 2. The main shaft 1 can be driven in an appropriate fashion in order to carry out a balancing operation on a rotary member to be balanced such as a motor vehicle wheel, and it is provided with suitable force-measuring devices for detecting unbalance of the rotary member carried on the main shaft 1.

A support flange member 3 is mounted on the main shaft 1 in such a way as to be axially displaceable thereon but non-rotatable thereon in the peripheral direction, for example by virtue of the provision of a suitable spline or key member which provides the axially displaceable and non-rotatable connection between the main shaft 1 and the support flange member 3. In a direction towards the body of the balancing machine, that is to say towards the left in FIG. 1, the support flange member 3 bears against a step 5, a shoulder or the like, in the axial direction of the main shaft 1.

Reference numeral 6 identifies a centering cone which is guided in a radially play-free manner on the main shaft 1 and which is resiliently support in a direction towards the body of the balancing machine by a coil spring 7 which can bear against the support flange member 3.

A pressure element 8 in the form of a cup-shaped member can be arranged over the free end 2 of the main shaft 1, and fixed on the main shaft 1. The pressure element 8 can be fixed on the main shaft 1 by the pressure element 8 which is connected for example to a screwthreaded sleeve portion 1 being screwed with the latter on to an external screwthread (not shown) on the main shaft 1 and locked to prevent that assembly from coming loose. The pressure element 8 can also be fixed on the main shaft 1 by a bayonet-type fixing (not shown) or by a separate clamping or retaining assembly, such as for example by a quick-action lock nut as indicated at 17 in FIG. 2 having locking elements which, after the nut 17 has been axially pushed on to the free end portion 2 of the main shaft 1, engage lockingly into a screwthread 18 as indicated in FIG. 2 on the main shaft 1 and which can be released again by actuating an unlocking system.

In addition, an actuating means 9 is arranged on the main shaft 1 between the support flange member 3 and a step 10 on the main shaft 1, at the side which is towards the body of the balancing machine. The actuating means 9 may be for example an axial expansion element as illustrated which is in the form of an annular air bellows 11 having an air connection 12 for pneumatic actuation of the air bellows 11. A feed of air to the interior of the air bellows 11 causes axial expansion thereof so that, as the air bellows 11 bears against the step 10, the air bellows 11 applies an axial pressure force to the support flange member 3 and causes displacement thereof on the main shaft 1.

The air bellows 11 can be mounted rotatably on the main shaft 1 so that it does not rotate with the main shaft 1, when the main shaft 1 rotates. In that case the air connection 12 can be in the form of a simple air feed line. As the support flange member 3 rotates with the main shaft 1, disposed between the air bellows 11 and the support flange member 3 is a motion-compensating element 13 for transmitting axial forces, being diagrammatically illustrated in FIG. 1 for example in the form of a thrust bearing, in order to allow for the relative movements between the air bellows 11 and the support flange member 3.

In order for a motor vehicle wheel or any other suitable rotary member having a central centering opening to be clamped fast on the main shaft 1 of the balancing machine for balancing thereof, the motor vehicle wheel or other rotary member is fitted with a central opening 15 such as the central opening in the disk portion of a motor vehicle wheel, from the end portion 2 on to the main shaft 1, and caused to bear against the centering cone 6 so that the latter engages into the opening 15 to provide for pre-centering of the rotary member on the main shaft 1. The pressure element 8 is mounted on the main shaft 1 and moved in the axial direction towards the rotary member or the disk portion 16 of the motor vehicle wheel until the pressure element 8 has centered the rotary member or disk portion 16 against the centering cone 6 which is resiliently axially supported by the coil spring 7. In that situation the disk portion 16 is not yet bearing against the support flange member 3. The pressure element 8 is fixed in that position on the main shaft 1, by clamping, engaging a retaining or detent means, or by means of a bayonet-type connection. For the purposes of fixing the centering effect, the operator is required to apply by hand a force which is substantially less than the force required for clamping the rotary member or motor vehicle wheel fast on the shaft 1.

The air bellows 11 is then pressurized by pneumatic actuation, that is to say by a supply of compressed air to the interior thereof, so that the air bellows 11 reacts to the feed of compressed air into its interior by expanding axially or increasing in length on the main shaft 1. By virtue of that axial expansion the support flange member 3 is displaced towards the disk portion 16 of the motor vehicle wheel which is held between the pressure element 8 and the centering cone 6. The centering thereof against the centering cone 6 which is held axially under a spring force is maintained in that situation. In dependence on the pneumatically adjustable axial force, the disk portion 16 is now pressed against the pressure element 8 with the required clamping or securing force so that the motor vehicle wheel is sufficiently non-rotatably fixed with respect to the main shaft 1 for rotation and acceleration thereof in the balancing operation.

The above-described clamping arrangement can be arranged in part or in total (with air bellows 11) on a sleeve which can be mounted and fixed on a main shaft. That permits existing balancing machines to be subsequently fitted with the clamping arrangement in a particularly simple fashion, without any modification to or alteration of the main shaft. In this case the sleeve includes the means for non-rotatably fixing the support flange member 3, as for example by means of a keyed shaft portion, a spline configuration or any other positively locking configuration, and for fixing the pressure element 8, for example by way of a lock nut with bayonet-type lock, a screw nut for engagement with an external screwthread on the sleeve, or by means of a quick-action lock nut. The sleeve can act as a compensating sleeve for adaptation to main shafts which differ for example in terms of size and/or configuration.

It will be appreciated that the above-described arrangement according to the invention has been described solely by way of example and illustration of the principles of the present invention and that various modifications and alterations may be made therein without thereby departing from the spirit and scope of the invention.

What is claimed is:

1. A clamping arrangement for clamping a rotary member to be balanced on a main shaft of a balancing machine, comprising a centering cone adapted to be axially resiliently supported on the main shaft for centering the rotary member with respect to the main shaft, a pressure element adapted to be fixed on the main shaft for pressing the rotary member against the centering cone into a centering position, a support flange member for holding the rotary member against the pressure element, means for mounting the support flange member non-rotatably and axially displaceably on the main shaft, and an actuating means for pressing the support flange member against a centeredly held rotary member so that said centeredly held rotary member can be clamped against the pressure element on the main shaft.

2. An arrangement as set forth in claim 1 wherein the actuating means has at least one axial expansion element adapted to be mounted on the main shaft.

3. An arrangement as set forth in claim 2 wherein the actuating means includes at least one pneumatically actuable air bellow.

4. An arrangement as set forth in claim 3 wherein the air bellow is annular and is adapted to be mounted to the periphery of the main shaft.

5. An arrangement as set forth in claim 1 including means for mounting the actuating means rotatably on the main shaft.

6. An arrangement as set forth in claim 1 wherein the pressure element is of a cup-shaped configuration.

7. An arrangement as set forth in claim 1 including a sleeve on which the support flange member, the centering cone and the pressure element are mounted and which is adapted to be fixed on the main shaft.

8. An arrangement as set forth in claim 7 wherein the actuating means is mounted on the sleeve.

9. An arrangement as set forth in claim 7 wherein the sleeve is a compensating sleeve for adaptation to different main shafts.

10. An arrangement as set forth in claim 1 wherein said rotary member comprises a motor vehicle wheel having a rim portion with a central centering opening.

11. A balancing machine including a main shaft for supporting a rotary member to be balanced, and a clamping arrangement for mounting the rotary member on the main shaft of the balancing machine, the arrangement comprising: a centering cone; means for axially resiliently supporting the cone of the main shaft for centering the rotary member with respect to the main shaft; a pressure element on the main shaft and operable to press the rotary member against the centering cone into a centering position; a support flange member for holding the rotary member against the pressure element; means for mounting the support flange member non-rotatably and axially displaceably on the main shaft; and an actuating means for pressing the support flange member against a centeredly held rotary member so that said centeredly held rotary member can be clamped against the pressure element on the main shaft.

* * * * *